Patented July 13, 1948

2,445,193

UNITED STATES PATENT OFFICE 2,445,193

DEASHING SULFONATED COUMARONE-INDENE RESINS

Andries Voet, New York, N. Y., assignor to The Neville Company, Pittsburgh, Pa., a corporation of Pennsylvania No Drawing. Application December 7, 1943, Serial No. 513,299

8 Claims. (Cl. 260—81)

This invention relates to the treatment of pure still residues to produce products of increased value and utility.

In the high temperature by-product coking of coal the common practice is to scrub the aromatic light oils from the oven gases with a wash oil. The resulting solution is then distilled to recover a mixture of the so-called light oils, chiefly benzol, toluol, xylol, and solvent naphtha. The light oil mixture is then fractioned to obtain impure cuts of the individual constituents which are usually treated to eliminate polymerizable constituents by agitating them vigorously with strong sulfuric acid. In this step the action of the acid and rise in temperature commonly cause other reactions to take place, such as sulfonation of the light oils or other aromatic materials present in lesser amounts. The light oil fraction is then separated from the acid and neutralized with an alkali, such as lime or soda ash, following which it is distilled to produce a commercially pure solvent. The latter distillation occurs in what are generally termed "pure stills" so that the residues which remain have come to be known in the trade as pure still residues. The usual practice is to mix the residues from the various pure stills.

Pure still residues are for the most part composed of high boiling aromatic compounds, or oils, together with polymerized substances in varying degrees of polymerization including a substantial portion of solid resinous polymers, together with mineral matter, or ash. This ash comprises in part sulphates, and the remainder of the ash is believed to be made up of calcium salts or sulfonates.

Despite various proposals for increasing their utility, pure still residues have in effect constituted a waste material because a number of factors have hindered their satisfactory and economical application to commercial uses. The residues may be distilled to separate the oil content and to recover the solid resinous material. Generally speaking, however, oil thus recovered has a rather objectionable odor and becomes dark colored rather rapidly upon standing. Such qualities make this oil unsuitable for many purposes despite its excellent inherent solvent quality.

Moreover, the ash present in the still residues, which commonly amounts to from 0.1 to 8 per cent by weight of the residues, naturally appears in the resin fraction, which may thus contain from about 1 to about 30 per cent by weight of ash. While such resins possess certain physical properties that are desirable for special purposes, the ash content of the resins causes them to be unsatisfactory and unacceptable except for a very few purposes where cheapness of resin outweighs other considerations.

Considerable difficulty has been encountered in attempts to de-ash the resin of pure still residues. Microscopic studies of pure still residues which I have made have shown that they contain visible particles showing the characteristics of calcium sulphate. Removal of those particles by centrifuging or by filtration removes only a portion of the ash content, however. Thus a typical still residue containing 7.1 per cent by weight of ash was centrifuged until the liquid contained practically no microscopically visible particles. In that condition the ash was reduced only to 3.4 per cent. This shows that a substantial proportion of the content of mineral matter of these residues is dissolved in them, probably in the form of calcium salts of sulfonates formed during the washing of the crude light oil with sulfuric acid and the subsequent neutralization with lime.

Various proposals have been made for removing ash from the resin of pure still residues. For example, it has been proposed to treat pure still residues with sulfuric acid while passing steam into the mixture, the idea being that the acid will decompose the sulfonates with formation of calcium sulphate which, like that initially present, may be separated relatively readily. I have found, however, that such a procedure not only does not wholly de-ash the resin but actually is objectionable. For example, a typical pure still residue treated with sulfuric acid at about 65° C. in accordance with that proposal contained, after treatment, appreciably more than 1 per cent of ash, so that resin recovered by distillation from it would contain, probably, about 4 to 5 per cent of ash. Another serious disadvantage of that procedure is that at the temperatures recommended the sulfuric acid produces other sulfonates (secondary sulfonation), or otherwise cause side reactions that are undesirable because they reduce the yield of resin and favor the formation of stable emulsions which interfere seriously, especially when it is attempted to neutralize the still residue with a dilute alkaline liquid, causing considerable loss.

Various other proposals have been made for treating pure still residues to recover products of enhanced value, but it is generally true of all of them that they have not been used commercially, at least on any extended scale, because of initially unrecognized factors that have militated against their adoption or their continued use.

A primary object of the present invention is to provide a method of treating pure still residues and resins derived from them to free them substantially completely from ash, or mineral matter, and which is inexpensive, easily performed, and efficient.

Another object is to treat pure still residues to render their resin content substantially ash-free and at the same time to confer selected solubility upon them.

Yet another object is to provide a method of treating pure still residues which renders aromatic oils recovered from them by distillation stable against darkening and production of objectionable odor.

Still another object is to provide a new type of resin.

Still other objects will be recognized from the following description.

I have discovered, and it is upon this that the invention is in part predicated, that the aforementioned disadvantages of the acid decomposition process of destroying sulfonates contained in these resins are avoided by conducting the decomposition at a lower temperature than proposed heretofore, suitably of the order of normal atmospheric temperature, and in any event at a temperature below 50° C. I have found that substantially complete de-ashing of the resin, avoidance of such side reactions as secondary sulfonation, tendency toward emulsion formation, and other troublesome factors, is critically dependent upon this control of temperature. Stated otherwise, maintenance of the reaction mixture below 50° C. during the acid treatment is critical if the resin is to be completely de-ashed and if the operation is to proceed satisfactorily. Moreover, this low temperature decomposition of calcium and the like metallic sulfonates substantially improves the ash removal as compared with the higher temperature proposal of the prior art.

In accordance with the invention the pure still residue is treated in solution in a suitable solvent which, as will appear hereinafter, may be of various types for the important purpose of conferring selected solubility upon the de-ashed resin. The solution is agitated vigorously with a dilute aqueous solution of a strong mineral acid, preferably sulfuric acid, care being taken that the temperature of the agitated mixture is below 50° C. and preferably at about normal room temperature. Agitation is then discontinued and the mixture is allowed to stratify. When the mixture has settled there will be at the bottom of the container an aqueous layer containing residual acid and the ash-producing salts initially present in the still residue together with those formed by reaction of the acid upon the calcium and the like metallic sulfonates. Depending upon the solvent used, the acid layer is usually covered by an oily liquid layer, usually dark and viscous, and this is followed by a supernatant layer consisting of a solution of constituents of the pure still residue in the original solvent. The aqueous layer may be run off, thus removing all of the mineral matter without the necessity for filtration or centrifuging. The other two layers are separated, either by decanting the upper solution layer or by running off the lower oily layer. In the practice of the invention there is no tendency for the materials to emulsify so that the various strata form quickly.

The solution of pure still residue thus produced is desirably given a water wash followed by neutralization with a dilute alkaline solution, after which the solvent is distilled off. The de-ashed pure still residue recovered in this manner is then distilled to drive off oils and non-resinous materials, as by steam distilling it to the point where high melting resin is recovered. Characteristically and importantly, the resin thus produced dissolves completely in the original solvent, or in solvents of greater solvent power, and it is freed from ash to a greater extent than resin produced by previous proposals.

The oil distilled from the resin as just described may be rendered stable and free from objectionable odor, as I have discovered, by agitating it with concentrated sulfuric acid, settling out the sludge, washing with water, and then with a dilute alkaline solution, and then distilling it, most suitably in vacuum. This produces a high boiling aromatic solvent oil which is nearly water white and practically odorless, and which upon storage does not darken or develop an objectionable odor.

The oily intermediate layer may be distilled, preferably with steam, to recover a de-ashed high melting and insoluble resin.

As exemplifying the practice of the invention 1000 grams of a typical pure still residue were dissolved in 2 liters of petroleum benzine. The solution was agitated while 500 grams of a solution of sulfuric acid (20 per cent by weight) were added slowly. After agitating for 10 minutes the mixture was allowed to settle. The aqueous layer at the bottom was drawn off and discarded. The intermediate oily layer was steam distilled and a high melting insoluble resin substantially free from ash was obtained. The upper solution layer was washed with 250 cc. of water and then with a like amount of a 4 per cent by weight solution of soda ash. The solvent was then distilled off and the recovered pure still residue was steam distilled to produce a high melting resin completely soluble in petroleum benzine at room temperature and containing less than 0.5 per cent by weight of ash.

Twenty parts by weight of the oil recovered from the resin by steam distillation were agitated for 10 minutes with one part by weight of concentrated sulfuric acid (1.84 sp. gr.). The sludge was then allowed to settle, the oil was separated from the sludge and washed with two parts of water followed by one part of a 4 per cent solution of soda ash. Vacuum distillation then produced an oil having the qualities described above.

On somewhat larger scale operation it is advantageous to add the dilute sulfuric acid in two portions, the first being drained before adding the second. Thus, 167 gallons of pure still residue are added to a mixture of 283 gallons of petroleum benzine and 50 gallons of benzol. Then 70 gallons of a solution composed of 10 gallons of 66° Bé. sulfuric acid and 60 gallons of water are added while agitating the mixture. After agitating for 1 hour, the solution is settled for 4 hours, and the precipitated ash and sludge are then drawn off. It is sometimes desirable to conduct a second acid treatment consisting of stirring the decanted oil with 23½ gallons of 20% sulfuric acid made up by adding 3½ gallons of 66° Bé. sulfuric acid to 20 gallons of water.

Although the invention has been described with particular reference to the use of sulfuric acid for sulphonate decomposition, other strong mineral acids, such as hydrochloric, phosphoric, or nitric acids, may be used. For reasons of economy, however, sulfuric acid is preferable. The acid is most suitably used as a relatively dilute solution, to insure avoidance of secondary sulfonation and other undesirable side reactions. However, if the acid is highly diluted there may be a tendency toward emulsification which would make stratification difficult or slow. Exact concentrations of acid can not be specified as applicable to all conditions because this will depend, as will be understood, upon such factors as the composition of the pure still residue being treated, the particular acid that is used, the concentration and type of the sulfonates in the residue, the concentration of resin in the still residue solution, and perhaps other factors. However, in the case of sulfuric acid I now prefer to use a solution of about 20 per cent by weight because it shows no tendency toward formation of emulsions with typical pure still residues, and no tendency toward side reactions.

Similarly, the optimum concentration of the still residue solution will depend upon such factors as resin content of the pure still residue, and the specific gravity and viscosity of the pure still residue. The concentration should be such, however, as to permit quick separation of the various layers and rapid settling of the mineral matter into the aqueous layer where the salts are insoluble. With a typical pure still residue which is viscous and contains about 7 to 10 per cent of ash I have found that satisfactory results may be had by using one volume of still residue to two volumes of solvent. Where the pure still residue is less viscous and contains less ash the proportions may be one to one, and even more concentrated solutions may be used with easy separation of the layers and settling of the ash.

The solution of pure still residue containing residual acid is preferably given a single washing with water and a single washing with dilute soda ash solution as indicated above. Other alkaline solutions may be used provided, however, that stable emulsions are not formed.

I have noted further that by appropriate selection of the solvent the solubility of the resin recovered from the solution may be controlled, at least within limits, thus making it possible to predetermine and vary the solubility characteristic of the de-ashed resin to fit it for particular applications. For example, the procedure of the foregoing example was repeated except that the solvent consisted of a mixture of 1 volume of benzene and 3 volumes of petroleum benzine. The resin recovered from the solution differed from that obtained in the foregoing example in that it was not completely soluble in aliphatic hydrocarbon solvents but was completely soluble in the benzene-petroleum benzine mixture used to make the solution for acid treatment. Moreover, this change in the solvent used reduced the quantity of the insoluble intermediate oily layer to about one-fourth that produced in the foregoing example, thus increasing the yield of the soluble resin. Thus, by appropriate selection of the solvent used there may be fractionally precipitated a greater or less amount of the insoluble type of resin so as to modify the solubility of the resin recovered from solution, which is soluble in the original solvent or in any solvent of greater solvent power.

The following table presents data obtained in the practice of this invention and illustrates its effectiveness in de-ashing the resin of pure still residues:

| Original Residue Ash, percent | Treated Resin Ash, percent |
|---|---|
| 7.16 | 0.18 |
| 0.83 | 0.02 |
| 0.25 | 0.00 |
| 0.08 | 0.00 |
| 0.60 | 0.06 |

The improved solubility of resins produced in accordance with the present invention may be demonstrated also by the cloud-point depression test in which the temperature at which a heated mixture of a resin and a mineral oil clouds on cooling. This gives a useful index of relative resin solubility. The resins produced from pure still residue are so dark colored that direct observation of cloudpoints is not practical. A comparative measure of their solubility may be had, however, by the use of a mixture of 1 part of the pure still residue resin with 4 parts by weight of a standard light-colored resin. In the following tests 14 grams of such a mixture were added to 6 grams of a heavy mineral oil. The mixture was heated with constant stirring until it was homogeneous, care being taken that the temperature did not exceed 200° C. The mixture was transferred to a ½-inch test tube and immersed for 15 minutes in a water bath at 90° C. The temperature was then allowed to drop about 2° C. per minute until a definite cloud developed. The cloudpoint was checked by reheating and cooling.

| Solvent Used | Percent Insolubles Removed | Cloudpoint Depression, °C |
|---|---|---|
| None | None | 5 |
| Benzol—1 vol | 4 | 13 |
| Pet. benzine—3 vol | | |
| Pet. benzine | 14 | 15 |

These data illustrate the excellent improved solubility of resins produced in accordance with the invention, as well as the manner in which the solubility can be varied by selection of the solvent used in the process.

The resins produced in this manner differ in both composition and properties from all other resins known to me and originating from coke oven gases. Thus, ordinary coumarone-indene resins are essentially pure polymers of coumarone and indene. On the other hand, resin produced from untreated still residues contains salts, usually calcium salts, of sulfonated indene and coumarone polymers, while if resin is produced by a previously known treatment of the still residues it is allegedly freed from the sulfonates. In contrast, and as demonstrable by analysis, resin produced by my method contains sulfonated coumarone-indene polymers but is essentially free of calcium and other metallic constituents. This results in differences exemplified by the following properties.

| | Coumarone-Indene Resin | Resin from Untreated Still Residues | Resin Produced According to Invention |
|---|---|---|---|
| Solubility (benzene) | Sol | Partly Sol | Sol. |
| Ash, percent | 0–1 | 18 to 25 | under 0.5. |
| Cloudpoint Depression | 7–9° C | 5° C | up to 15° C. |
| Viscosity at 225° C., Centipoises | 23 | Above 1000 | 386. |
| Reaction | Neutral | Alkaline | Slightly Acid. |
| Fracture | Conchoidal | Non-Conchoidal | Conchoidal. |

Although the invention has been described with particular reference to the treatment of pure still residues (whether from individual pure stills or mixtures) it will be understood that it is applicable also to the de-ashing of resins obtained from pure still residues, with appropriate modification due to the fact that the resin initially carried little or no high boiling oil, and the term "pure still residues" used in the claims is therefore to be understood as including such treatment of resin.

According to the provisions of the patent statutes, I have explained the principle and mode of practicing my invention and having described what I now consider to represent its best embodiment. However, I desire to have it understood that, within the scope of the appended claims, the invention may be practiced otherwise than as specifically described.

I claim:

1. That method of de-ashing resin of pure still residues remaining from distillation of fractions of light oil produced in high temperature by-product coking of coal and containing ash composed or inorganic sulfate and inorganic salts of coumarone and indene sulfonates, which comprises mixing the pure still residues with a solvent for pure still residues, agitating the resultant solution with a dilute solution of a strong mineral acid while keeping it at a temperature of the order of normal room temperature and below 50° C., then settling the reaction mixture to form an acid layer containing ash present in said residues, an oily layer overlying said acid layer, and a supernatant layer of a solution of said residues substantially free from ash, separating said layers, neutralizing said solution layer with an aqueous solution of an alkali carbonate, and distilling the neutralized solution and recovering an aromatic oil and a resin comprising sulfonated polymers of coumarone and indene that is completely soluble in said solvent and contains not over about 0.5 per cent of ash.

2. A method according to claim 1, said acid being sulfuric acid.

3. That method of de-ashing resin of pure still residues remaining from distillation of fractions of light oil produced in high temperature by-product coking of coal and containing ash composed or inorganic sulfate and inorganic salts of coumarone and indene sulfonates, which comprises mixing the pure still residues with a mixed aliphatic-aromatic solvent for pure still residues, agitating the resultant solution with a dilute solution of a strong mineral acid while keeping it at a temperature of the order of normal room temperature and below 50° C., then settling the reaction mixture to form an acid layer containing ash present in said residues, an oily layer overlying said acid layer, and a supernatant layer of a solution of said residues substantially free from ash, separating said layers, neutralizing said solution layer with a dilute solution of an alkali, and distilling the neutralized solution and recovering an aromatic oil and a resin comprising sulfonated polymers of coumarone and indene that is completely soluble in said solvent and contains not over about 0.5 per cent of ash.

4. A method according to claim 3, said acid being sulfuric acid.

5. That method of de-ashing resin of pure still residues remaining from distillation of fractions of light oil produced in high temperature by-product coking of coal and containing ash composed of inorganic sulfate and inorganic salts of coumarone and indene sulfonates, which comprises mixing the pure still residues with a solvent for pure still residues, agitating the resultant solution with a dilute solution of a strong mineral acid while keeping it at a temperature of the order of normal room temperature and below 50° C., then settling the reaction mixture to form an acid layer containing ash present in said residues, an oily layer overlying said acid layer, and a supernatant layer of a solution of said residues substantially free from ash, separating said layers, neutralizing said solution layer with a dilute solution of alkali, and steam distilling the neutralized solution and recovering an aromatic oil and a resin comprising sulfonated polymers of coumarone and indene that is completely soluble in said solvent and contains not over about 0.5 per cent of ash; and agitating said recovered aromatic oil with concentrated sulfuric acid, separating the treated oil from sludge, and neutralizing the oil and distilling it to recover the oil stabilized against color and odor changes.

6. A method according to claim 4, said mineral acid being sulfuric acid.

7. That method of de-ashing resin of pure still residues remaining from distillation of fractions of light oil produced in high temperature by-product coking of coal and containing ash composed of inorganic sulfate and inorganic salts of coumarone and indene sulfonates, which comprises mixing the pure still residues with a solvent for pure still residues, agitating the resultant solution with a dilute solution of a strong mineral acid while keeping it at a temperature of the order of normal room temperature and below 50° C., then settling the reaction mixture to form an acid layer containing ash present in said residues, an oily layer overlying said acid layer, and a supernatant layer of a solution of said residues substantially free from ash, separating said layers, washing said solution layer with water and then with a dilute solution of sodium carbonate, and steam distilling the neutralized solution and recovering an aromatic oil and a resin comprising sulfonated polymers of coumarone and indene that is completely soluble in said solvent and contains not over about 0.5 per cent of ash; agitating said recovered aromatic oil with concentrated sulphuric acid, separating the treated oil from sludge, neutralizing the oil and vacuum distilling it to recover the oil stabilized against color and odor changes.

8. That method of de-ashing resin of pure still residues remaining from distillation of fractions of light oil produced in high temperature by-product coking of coal and containing ash composed of inorganic sulfate and inorganic salts of coumarone and indene sulfonates, which comprises mixing the pure still residues with a solvent for pure still residues, agitating the resultant solution with a dilute solution of a strong mineral acid while keeping it at a temperature of the order of normal room temperature and below 50° C., then settling the reaction mixture to form an acid layer containing ash present in said residues, an oily layer overlying said acid layer, and a supernatant layer of a solution of said residues substantially free from ash, separating said layers, neutralizing said solution layer with a dilute solution of sodium carbonate, and steam distilling the neutralized solution and recovering an aromatic oil and a resin comprising sulfonated polymers of coumarone and indene that is completely soluble in said solvent and contains not over about 0.5 per cent of ash; agitating said recovered aromatic oil with concentrated sulfuric acid, separating the treated oil from sludge, and neutralizing the oil and distilling it to recover the oil stabilized against color and odor changes; and steam distilling said oily layer and recovering an oil and an insoluble resin of high melting point.

ANDRIES VOET.

REFERENCES CITED

The following references are of record in the file of this patent:

UNITED STATES PATENTS

| Number | Name | Date |
|---|---|---|
| 1,365,423 | Miller | Jan. 11, 1921 |
| 1,570,584 | Ellis | Jan. 19, 1926 |
| 1,797,260 | Ellms | Mar. 24, 1931 |
| 2,209,322 | Corkery | July 30, 1940 |

FOREIGN PATENTS

| Number | Country | Date |
|---|---|---|
| 172,048 | Great Britain | Nov. 25, 1921 |
| 157,715 | Great Britain | Mar. 30, 1922 |